(12) United States Patent
Subramanian et al.

(10) Patent No.: US 11,926,276 B2
(45) Date of Patent: Mar. 12, 2024

(54) CURVED STRUCTURE FOR A WORK VEHICLE

(71) Applicant: DEERE & COMPANY, Moline, IL (US)

(72) Inventors: Arun Subramanian, Chennai (IN); Roberto Morales, Saltillo (MX); Jose Legorreta, Saltillo (MX)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/809,925

(22) Filed: Jun. 30, 2022

(65) Prior Publication Data
US 2024/0001880 A1    Jan. 4, 2024

(51) Int. Cl.
*B60R 21/11* (2006.01)
*B60R 21/13* (2006.01)
*B60J 1/02* (2006.01)

(52) U.S. Cl.
CPC ............ *B60R 21/11* (2013.01); *B60R 21/131* (2013.01); *B60J 1/02* (2013.01)

(58) Field of Classification Search
CPC ........... B60R 21/11; B60R 21/131; B60J 1/02
USPC ........................................................ 296/77.1
See application file for complete search history.

(56) References Cited

U.S. PATENT DOCUMENTS

| | | |
|---|---|---|
| 1,465,712 A | 8/1923 | Hanson |
| 2,256,890 A | 9/1941 | Brown et al. |
| 2,805,887 A | 9/1957 | Selby |
| 3,036,858 A | 5/1962 | Fingerut |
| 3,244,251 A * | 4/1966 | Duncan ................. A01B 51/00 188/177 |
| 3,443,833 A | 5/1969 | Miller et al. |
| 3,561,785 A * | 2/1971 | Kidder ..................... B60R 21/11 296/102 |
| 3,572,819 A | 3/1971 | Moore |
| 3,619,000 A | 11/1971 | Macarus |
| 3,704,030 A * | 11/1972 | McFerron ............. B60R 21/131 296/102 |
| 3,983,952 A * | 10/1976 | McKee ................... B60L 50/64 180/68.5 |
| 4,050,535 A | 9/1977 | Bosshart et al. |
| 4,372,602 A * | 2/1983 | Tsuchiya ................. B62K 5/01 296/78.1 |

(Continued)

FOREIGN PATENT DOCUMENTS

| | | |
|---|---|---|
| DE | 1104244 B | 4/1961 |
| DE | 2148162 A1 | 4/1973 |

(Continued)

OTHER PUBLICATIONS

Fops-Rops roof, <URL: https://www.hoflader.com/en/products/patentiertes-hydraulisch-absenkbares-fops-rops-dach>, accessed Dec. 23, 2021.

(Continued)

*Primary Examiner* — Hilary L Gutman

(57) ABSTRACT

A curved structure for a work vehicle includes a first curved support extending a length, a second curved support extending a length, the second curved support spaced apart a width from the first curved support, and a curved windshield positioned between and connected to the first and second curved supports.

9 Claims, 12 Drawing Sheets

(56) References Cited

U.S. PATENT DOCUMENTS

| | | | | |
|---|---|---|---|---|
| 4,573,546 | A | * | 3/1986 | Irimajiri ............... B62D 61/065 |
| | | | | 180/211 |
| 4,671,563 | A | * | 6/1987 | Shakespear ............. B60N 2/14 |
| | | | | 296/202 |
| 4,813,706 | A | * | 3/1989 | Kincheloe ............... B60R 21/13 |
| | | | | 280/756 |
| 4,966,408 | A | * | 10/1990 | Yura ...................... B60K 11/08 |
| | | | | 180/89.2 |
| 4,973,082 | A | * | 11/1990 | Kincheloe ............... B60R 22/00 |
| | | | | 296/78.1 |
| D355,403 | S | * | 2/1995 | Eberle .......................... D12/402 |
| D376,604 | S | * | 12/1996 | Johnson ......................... D15/30 |
| 6,142,253 | A | * | 11/2000 | Mueller ................. B62K 11/10 |
| | | | | 180/908 |
| 6,189,955 | B1 | | 2/2001 | Fryk et al. |
| D442,119 | S | * | 5/2001 | Murata .......................... D12/86 |
| 6,260,913 | B1 | * | 7/2001 | Sekita ................. B62D 21/183 |
| | | | | 296/68.1 |
| 6,394,118 | B1 | * | 5/2002 | Cikanowick ............ E04H 15/06 |
| | | | | 135/88.13 |
| 6,543,830 | B1 | * | 4/2003 | Stuck .................... B60J 5/0487 |
| | | | | 296/77.1 |
| 7,066,526 | B2 | * | 6/2006 | Weddington ............. B60J 7/102 |
| | | | | 296/105 |
| 7,222,882 | B2 | | 5/2007 | Boucher |
| D588,046 | S | * | 3/2009 | Fitzgerald ...................... D12/16 |
| D602,398 | S | * | 10/2009 | Imbert .......................... D12/14 |
| D607,903 | S | * | 1/2010 | Selmeci ........................ D15/33 |
| 7,854,463 | B1 | * | 12/2010 | Neumann .......... B62D 33/0621 |
| | | | | 296/144 |
| 8,322,749 | B2 | * | 12/2012 | Srabstein ................. B62J 27/30 |
| | | | | 280/756 |
| 8,579,363 | B2 | | 11/2013 | Davis et al. |
| 8,641,093 | B1 | | 2/2014 | Knight |
| D705,127 | S | * | 5/2014 | Patterson ........................ D12/87 |
| 9,260,149 | B2 | * | 2/2016 | Zhang .................... B62K 11/02 |
| 9,422,020 | B2 | * | 8/2016 | Kim .......................... B62J 17/08 |
| 9,981,545 | B1 | | 5/2018 | Padhan et al. |
| 10,328,883 | B2 | | 6/2019 | Stuber |
| 11,203,253 | B2 | * | 12/2021 | Nakaji ........................ B60J 1/06 |
| 2001/0035666 | A1 | * | 11/2001 | Allen ....................... B62J 17/08 |
| | | | | 296/102 |
| 2002/0011374 | A1 | * | 1/2002 | Brister ................. B62D 21/183 |
| | | | | 180/312 |
| 2010/0096200 | A1 | * | 4/2010 | Bombarda ............... B62J 17/08 |
| | | | | 296/205 |
| 2010/0147603 | A1 | * | 6/2010 | Davis .................. B62D 33/0617 |
| | | | | 180/9.46 |
| 2016/0052582 | A1 | * | 2/2016 | Louisa .................... B60R 21/13 |
| | | | | 296/190.03 |
| 2023/0055378 | A1 | * | 2/2023 | Newcomb ............. B62D 25/06 |

FOREIGN PATENT DOCUMENTS

| | | | | |
|---|---|---|---|---|
| EP | 3819196 | A1 * | 5/2021 | ......... B62D 33/0617 |
| FR | 2347224 | A1 | 11/1977 | |
| GB | 1218714 | A | 1/1971 | |
| WO | WO-2019172586 | A1 * | 9/2019 | ........... B60R 21/131 |

OTHER PUBLICATIONS

Side Protection, <URL: https://www.mclennan-engineering.com.au/tractor-cages>, accessed Sep. 10, 2021.

Roof Protection, <URL: https://www.tractorbynet.com/forums/threads/jd-4720-woods-canopy-build.370716/page-2>, accessed Sep. 10, 2021.

* cited by examiner

CURVED STRUCTURE FOR A WORK VEHICLE

FIELD OF THE DISCLOSURE

The present disclosure relates to a curved structure for a work vehicle.

BACKGROUND

Work vehicles can include curved structures near a vehicle operator. These structures can include roll over protection systems or ROPS. Many of these structures are positioned behind the operator seat.

SUMMARY

According to an aspect of the present disclosure, a curved structure for a work vehicle includes a first curved support extending a length, a second curved support extending a length, the second curved support spaced apart a width from the first curved support, and a curved windshield positioned between and connected to the first and second curved supports.

The curved structure can include a top support connected near an end of the first curved support and an end of the second curved support.

The first curved support, the second curved support, and the top support can be a single piece.

The curved windshield can extend upward and rearward beyond a front portion of a seat in the work vehicle.

The curved structure can include a first base portion configured to mount to a chassis of the work vehicle, the first base portion positioned near an end of the first curved support, and a second base portion configured to mount to a chassis of the work vehicle, the second base portion positioned near an end of the second curved support.

The first and second base portions can be configured to attach to a chassis of the work vehicle at a position forward of a steering wheel of the work vehicle.

The curved structure can include a first rear support connected near an end of the first support and to the work vehicle, and a second rear support connected near an end of the second support and to the work vehicle.

An angle of an arc formed by the first curved support can be greater than forty-five degrees.

An angle of an arc formed by the first curved support can be greater than seventy-five degrees.

An angle of an arc formed by the first curved support can be less than one hundred thirty-five degrees.

An angle of an arc formed by the first curved support can be less than one hundred twenty degrees.

According to an aspect of the present disclosure, a work vehicle having a curved structure includes a first curved support extending a length, a second curved support extending a length, the second curved support spaced apart a width from the first curved support, and a curved windshield positioned between and connected to the first and second curved supports.

The work vehicle can include a top support connected near an end of the first curved support and an end of the second curved support.

The first curved support, the second curved support, and the top support can be a single piece.

The curved windshield can extend upward and rearward beyond a front portion of a seat in the work vehicle.

The work vehicle can include a first base portion attached to a chassis of the work vehicle, the first base portion positioned near an end of the first curved support, and a second base portion attached to a chassis of the work vehicle, the second base portion positioned near an end of the second curved support.

The first and second base portions can be attached to a chassis of the work vehicle at a position forward of a steering wheel of the work vehicle.

The work vehicle can include a first rear support connected near an end of the first support and to the work vehicle, and a second rear support connected near an end of the second support and to the work vehicle.

An angle of an arc formed by the first curved support can be between sixty and one hundred twenty degrees.

An angle of an arc formed by the first curved support can be between seventy-five and one hundred five degrees.

The above and other features will become apparent from the following detailed description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
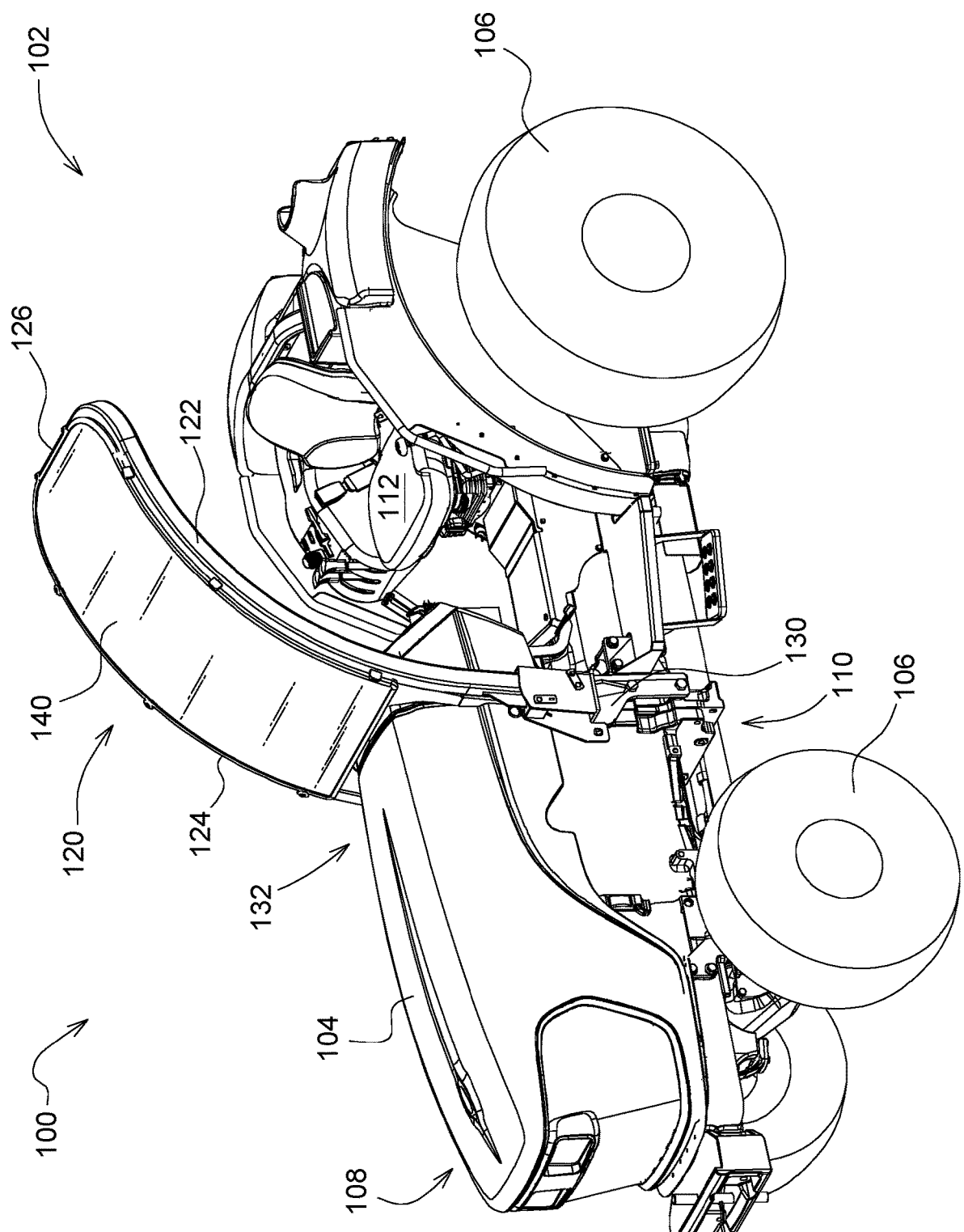
FIG. 1 is a perspective view of a work vehicle including a curved structure, according to an implementation.
Figure 2:
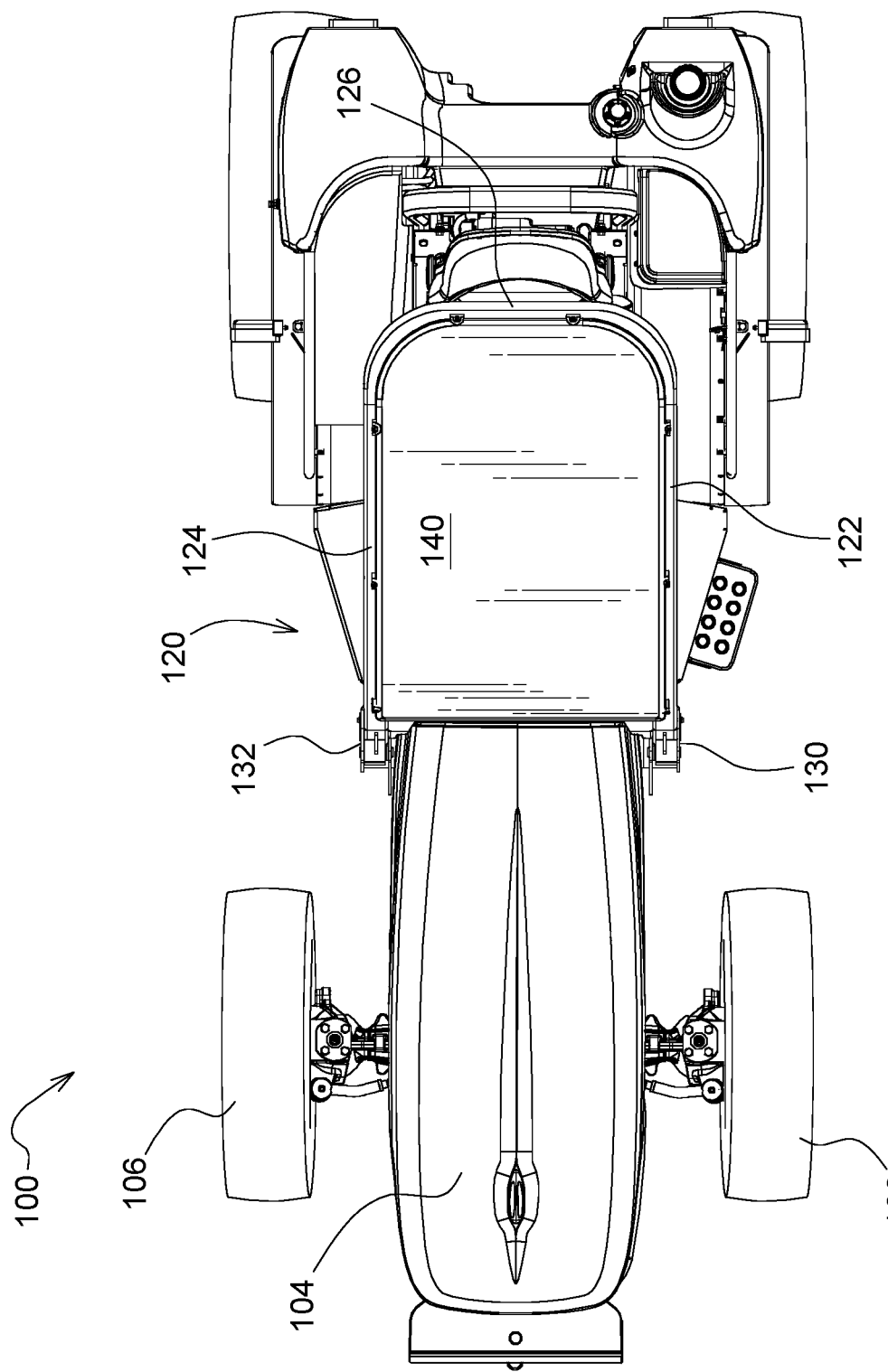
FIG. 2 is a top perspective view of a work vehicle including a curved structure, according to an implementation.
Figure 3:
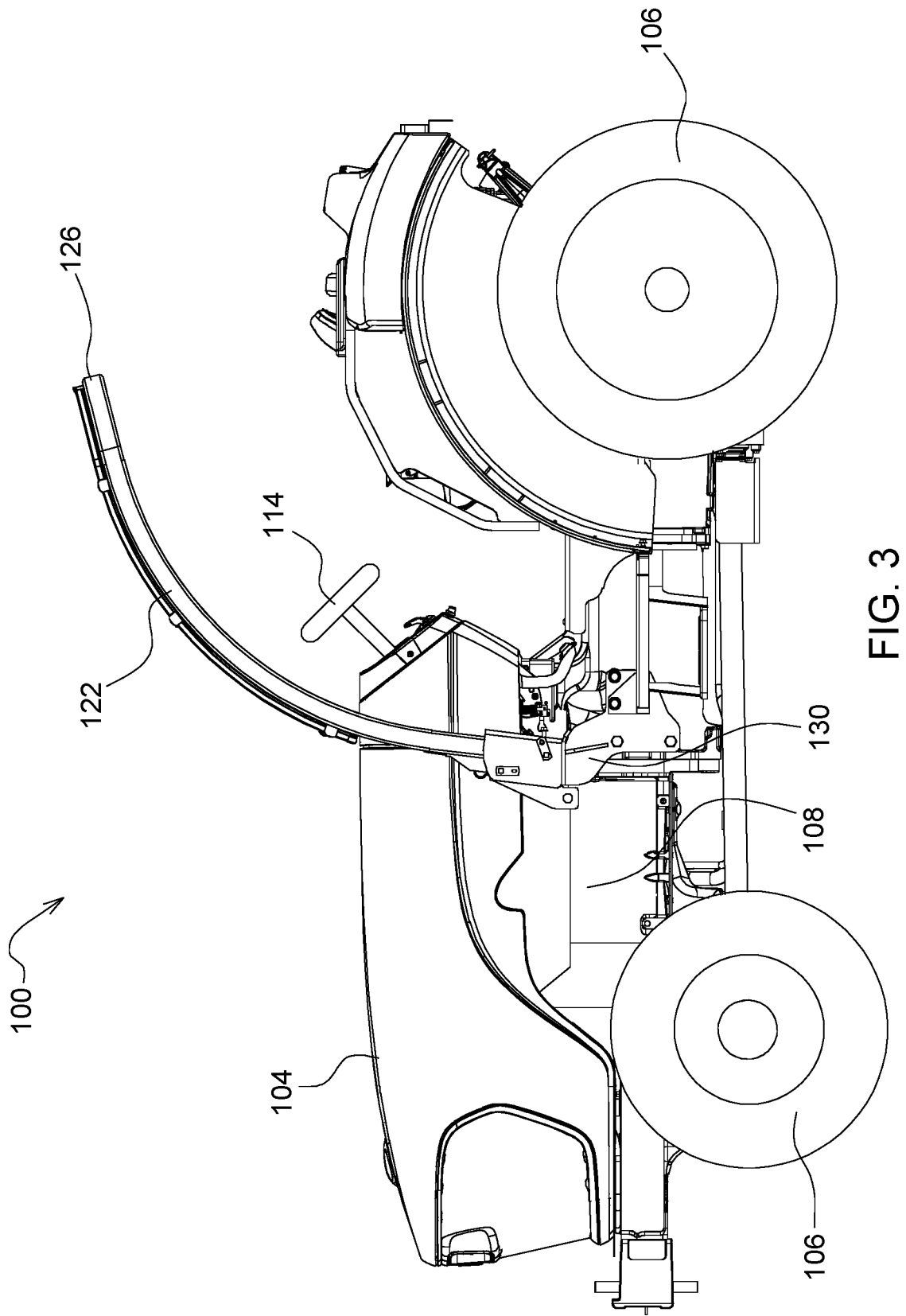
FIG. 3 is a side perspective view of a work vehicle including a curved structure, according to an implementation.
Figure 4:
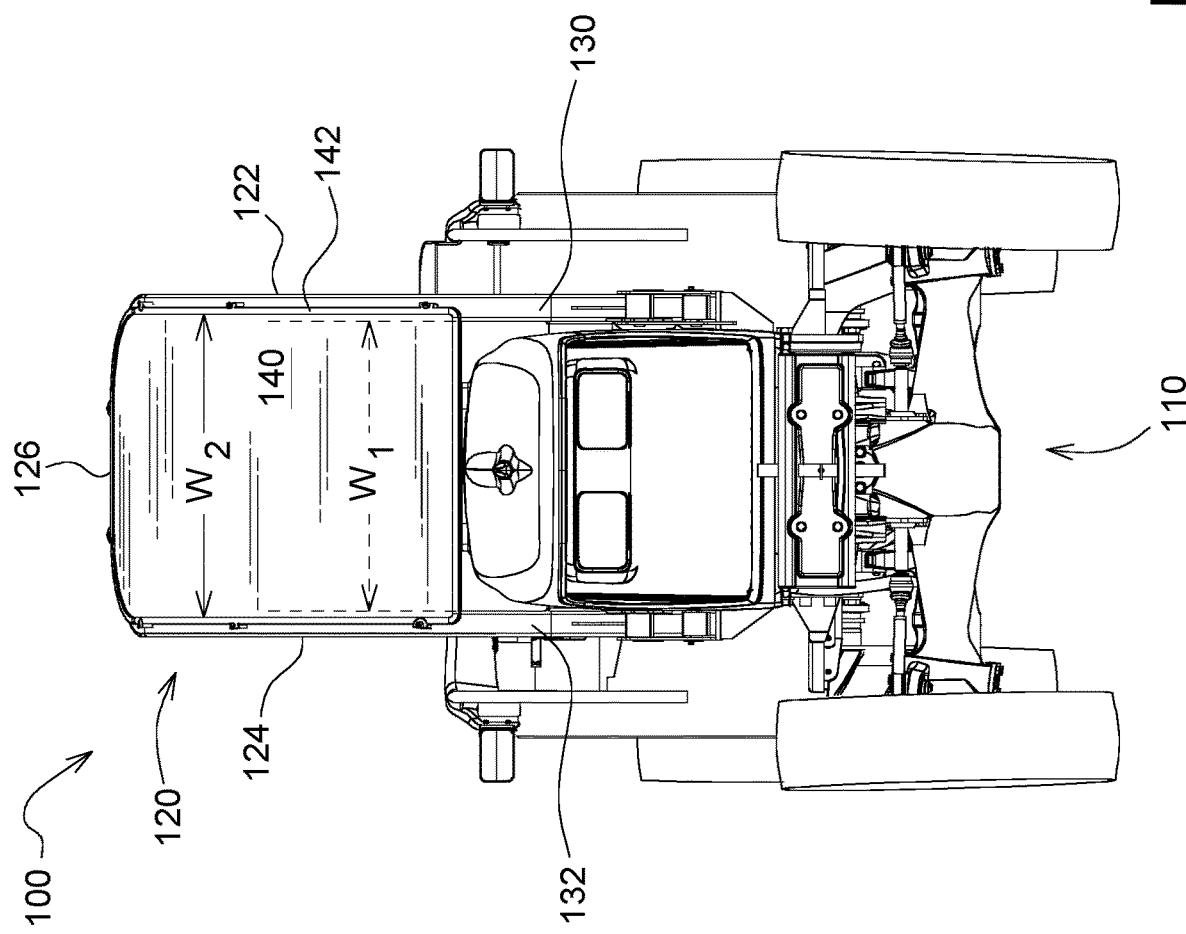
FIG. 4 is a front perspective view of a work vehicle including a curved structure, according to an implementation.
Figure 5:
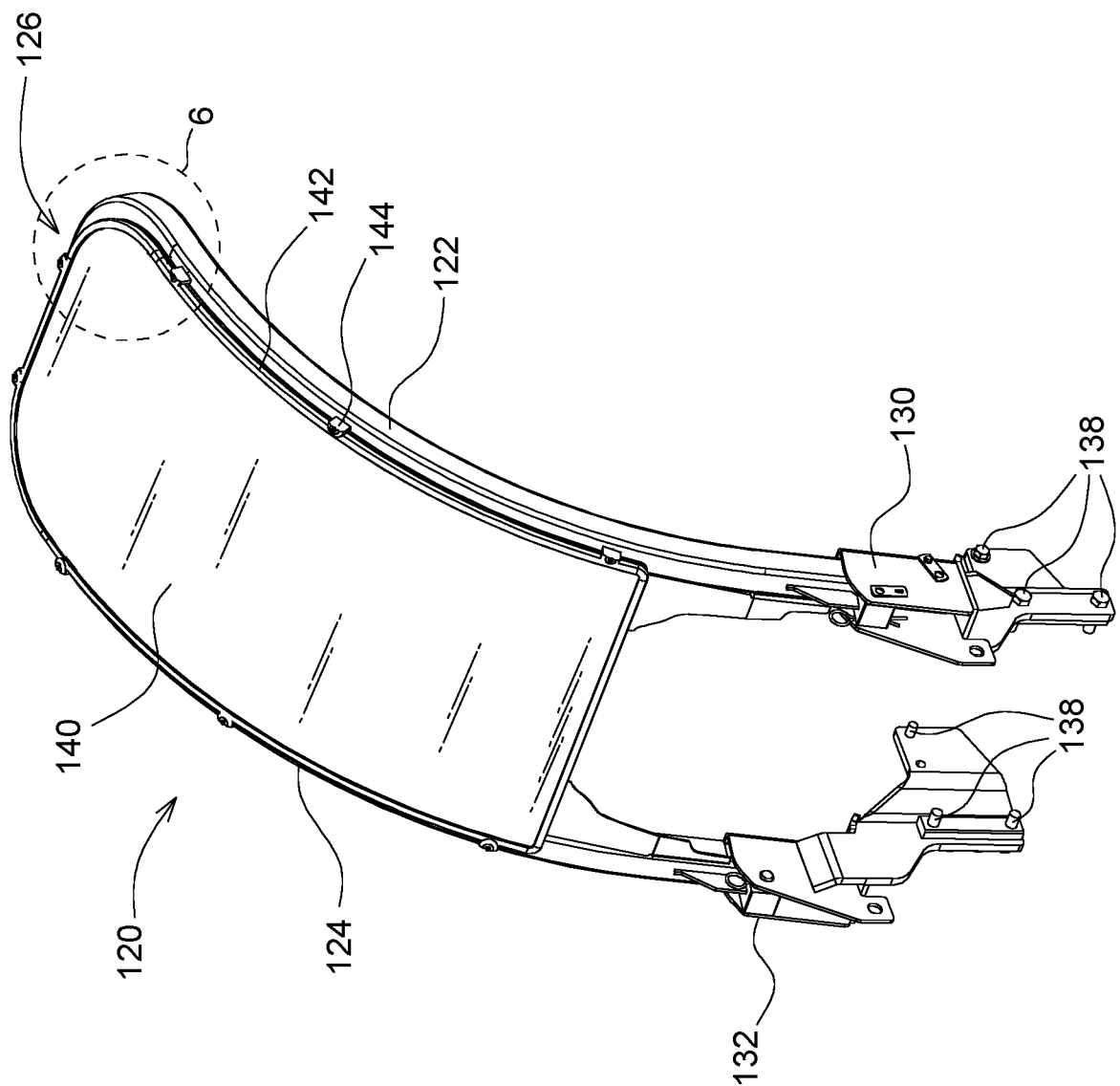
FIG. 5 is a perspective view of a curved structure, according to an implementation.
Figure 6:
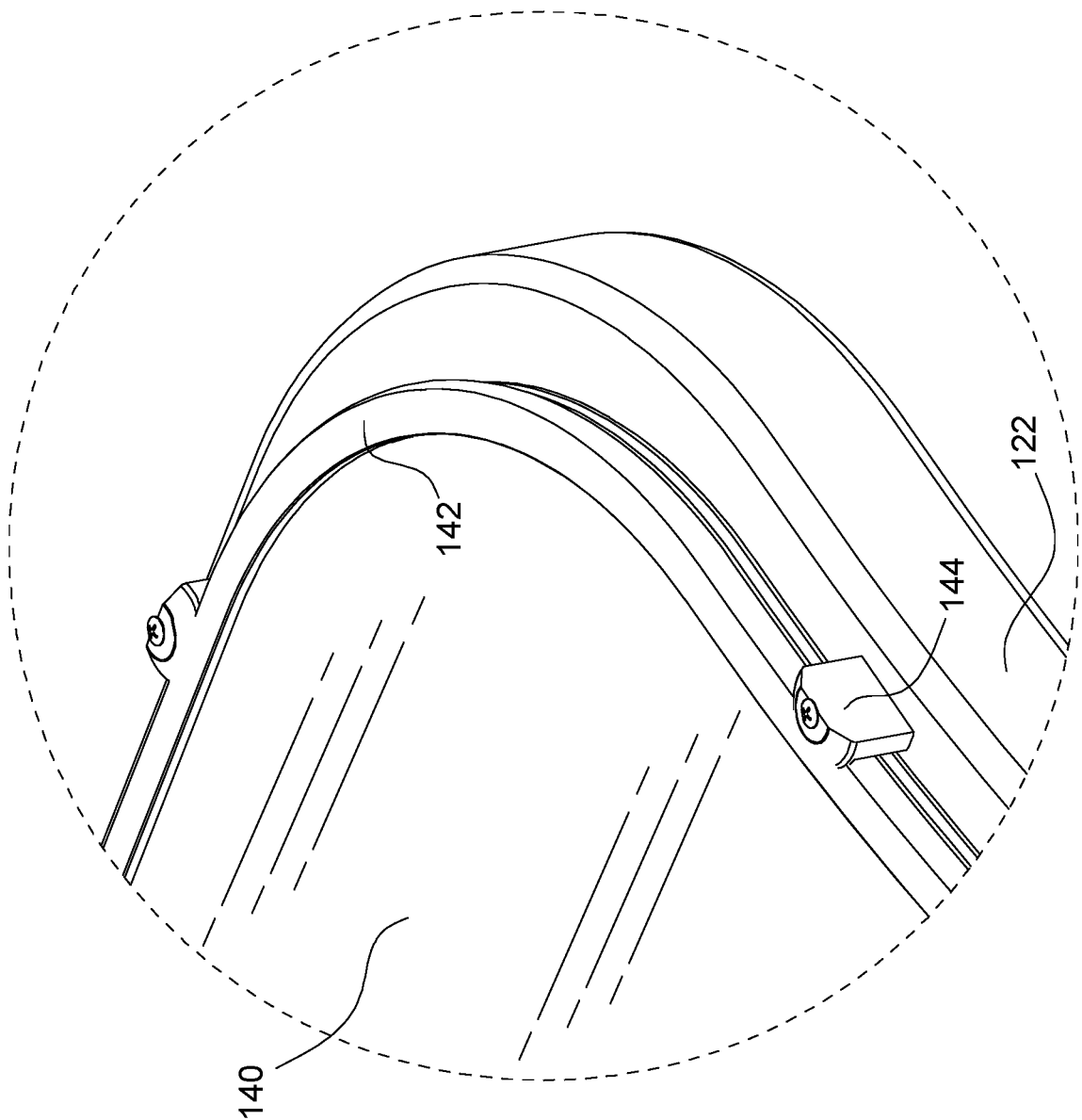
FIG. 6 is a detail view of a curved structure, according to an implementation.
Figure 7:
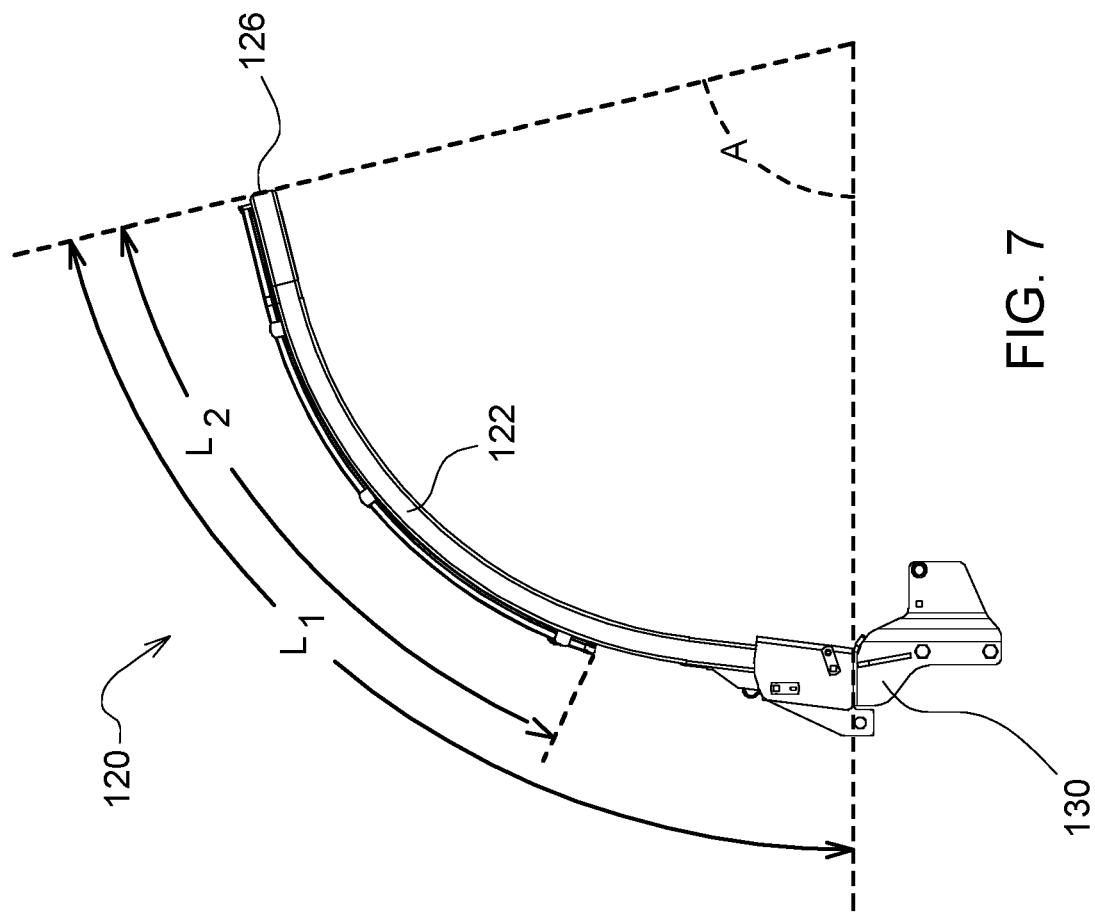
FIG. 7 is a side perspective view of a curved structure, according to an implementation.

The implementations disclosed in the above drawings and the following detailed description are not intended to be exhaustive or to limit the present disclosure to these implementations.

With reference to FIGS. 1-7, a curved structure 120 can be attached or installed on a work vehicle 100, such as a tractor. The present disclosure also applies to other types of work vehicles in agriculture, construction, road building, forestry, utility, turf, and lawn care. The work vehicle 100 can includes an open operator station 102 having various devices and controls to operate the work vehicle 100. The work vehicle 100 includes a hood 104, one or more ground engaging apparatus 106, a power source 108, and a frame or chassis 110. The work vehicle 100 includes a seat 112. The curved structure 120 can include a first support 122, a second support 124 spaced apart a width $W_1$ from the first support 122, and a windscreen or windshield 140 positioned between and connected to the first and second supports 122, 124. The first and second supports 122, 124 can each be arcuate or curvilinear and extend a length $L_1$. The windshield 140 can be curvilinear or curved and extend a width $W_2$ and a length $L_2$. The windshield 140 can have a shorter length $L_2$ than the length $L_1$ of the first and second supports 122, 124. The windshield 140 can have a larger width $W_2$ than the width $W_1$ of the space between the first and second supports 122, 124. The windshield 140 can include a frame 142 surrounding at least a portion of the windshield 140.

The curved structure 120 can include a top support 126 connected near an end of the first support 122 and near an end of the second support 124. The end of the first support 122 and the end of the second support 124 can curve inwards towards each other. the top support 126 can connect the inwardly curving ends of the first and second supports 122, 124. In some implementations, the first curved support 122, the second curved support 124, and the top support 126 are a single or unitary piece or part. The curved structure 120 can include a curvilinear or curved transition between the first support 122 and the top support 126 and between the second support 124 and the top support 126. The frame 142 can have one or more connectors 144 to connect or attach the windshield 140 to one or more of the first, second, and top supports 122, 124, 126. using fasteners, for example. The other ends of the first and second supports 122, 124 can include first and second base portions 130, 132 configured to mount to a frame or chassis 110 of a work vehicle 100.

The first support 122, the second support 124, or both can form an arc having an angle A of any size, dimension, or range. The first and second supports 122, 124 and the windshield 140 can have a similar or the same curvilinear shape or radius of curvature, which can be fixed or variable. According to some implementations, an angle A of an arc formed by the first support 122 is greater than forty-five degrees (45°), greater than seventy-five degrees (75°), or greater than ninety degrees (90°). According to other implementations, an angle A of an arc formed by the first curved support 122 is less than one hundred thirty-five degrees (135°), less than one hundred twenty degrees (120°), less than one hundred degrees (100°), or less than ninety degrees (90°). According to other implementations, an angle A of an arc formed by the first support 122 is between sixty and one hundred twenty degrees (60°-120°), between seventy-five and one hundred five degrees (75°-105°), or between eighty and one hundred degrees (80°-100°).

The curved structure 120 can connect to the work vehicle 100 at a position or location forward of the operator station 102. The first and second base portions 130, 132 of the curved structure 120 can include fasteners 138 to attach to the work vehicle 100. The first and second base portions 130, 132 can attach to frame or chassis 110 of the work vehicle 100 at a position or location forward of a steering wheel 114 of the work vehicle 100. When the curved structure 120 is installed in a work vehicle 100, a top portion of the curved structure 120 can extend upward and rearward beyond a front portion of a seat 112 in the work vehicle 100. The windshield 140 can extend vertically and horizontally beyond a front portion of a seat 112 in the work vehicle 100. In some implementations, the top portion of the curved structure 120 and the windshield 140 can extend upward and rearward beyond a majority of the seat 112, as shown for example in FIG. 2.

Figure 8:
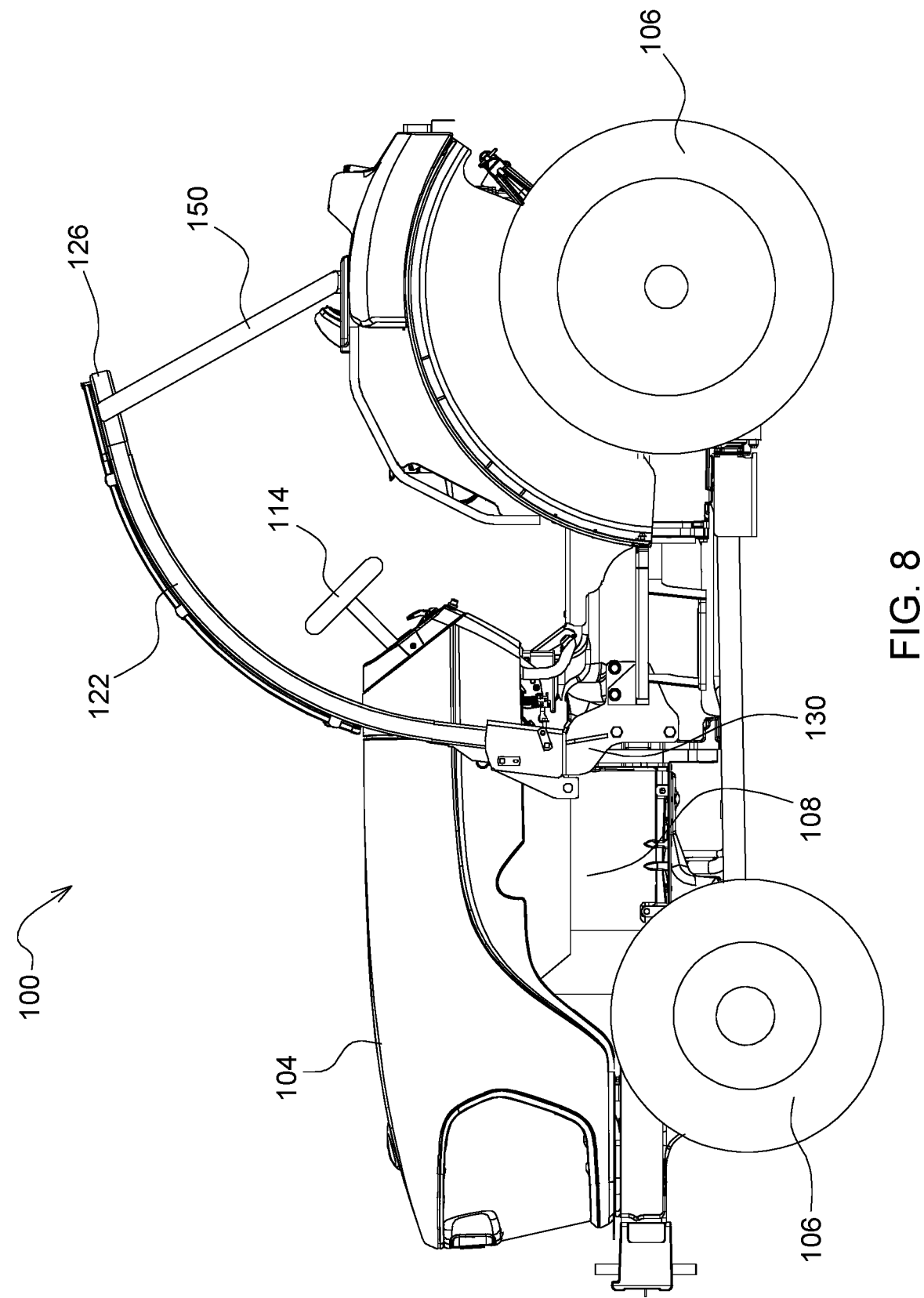
FIG. 8 is a side perspective view of a work vehicle including a curved structure, according to an implementation.
Figure 9:
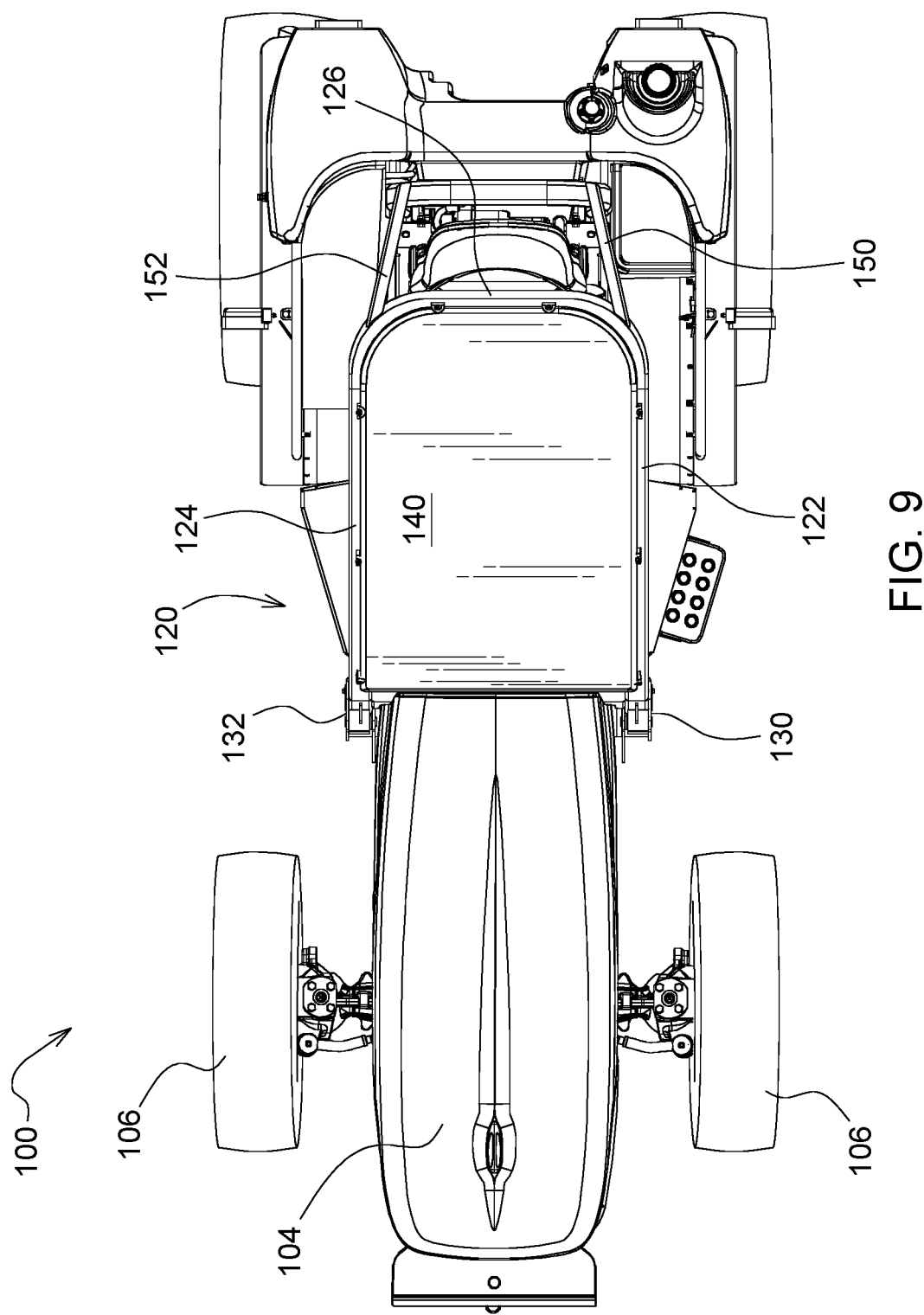
FIG. 9 is a top perspective view of a work vehicle including a curved structure, according to an implementation.

With reference to FIGS. 8-9, one or more rear supports 150, 152 can connect to the curved support 120 and to the work vehicle 100. The curved structure 120 can include a first rear support 150 connected near an end of the first support 122 and to the work vehicle 100. The curved structure 120 can include a second rear support 152 connected near an end of the second support 124 and to the work vehicle 100. Alternatively, or additionally, the first and second rear supports 150, 152 can connect to the top support 126 or to the transitions between the top support 126 and the first and second supports 122, 124. The first and second rear supports 150, 152 can be angled forward from the work vehicle 100 to the curved structure 120, as shown. Alternatively, the first and second rear supports 150, 152 can be angled rearward from the work vehicle 100 to the curved structure 120, or the first and second rear supports 150, 152 can extend substantially vertical from the work vehicle 100 to the curved structure 120.

Figure 10:
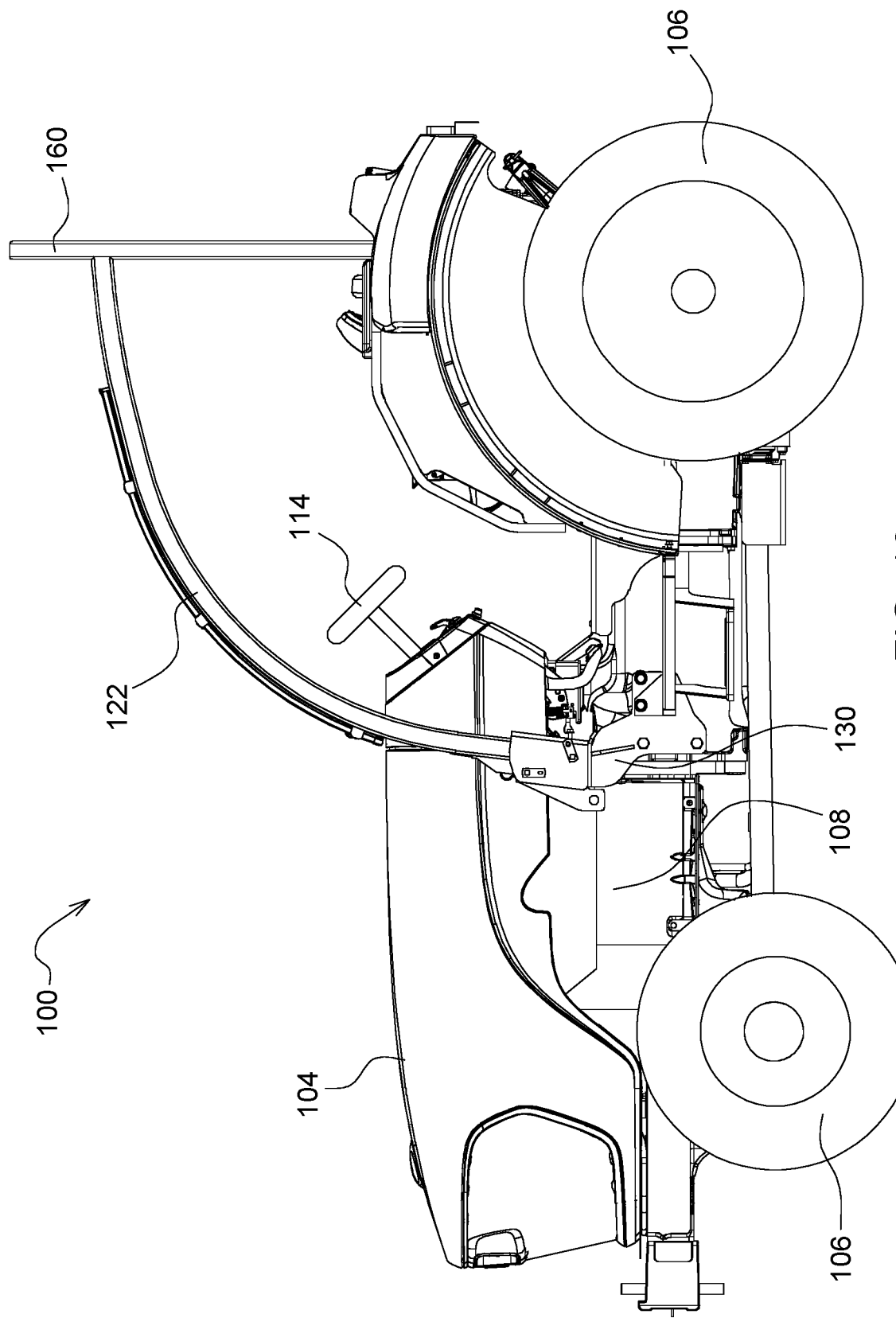
FIG. 10 is a side perspective view of a work vehicle including a curved structure, according to an implementation.
Figure 11:
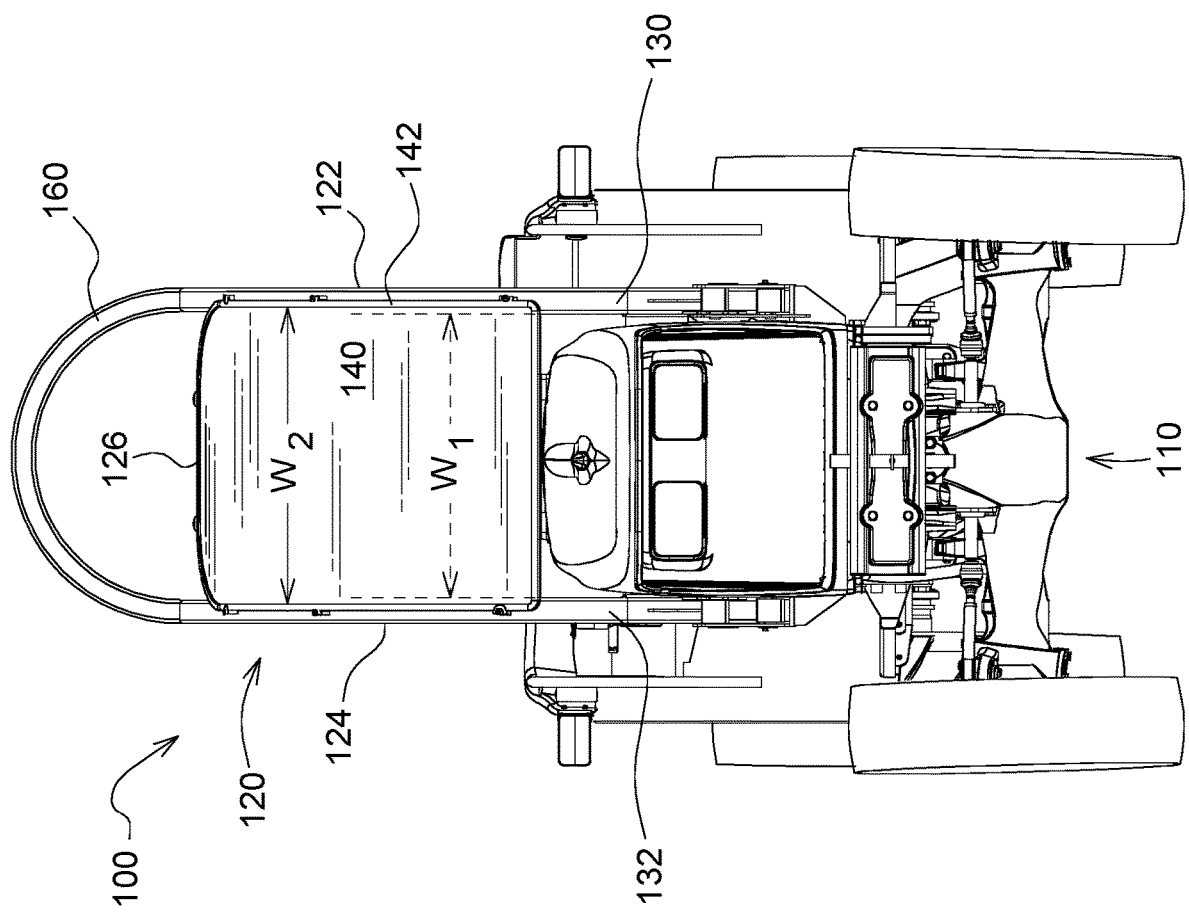
FIG. 11 is a front perspective view of a work vehicle including a curved structure, according to an implementation.
Figure 12:
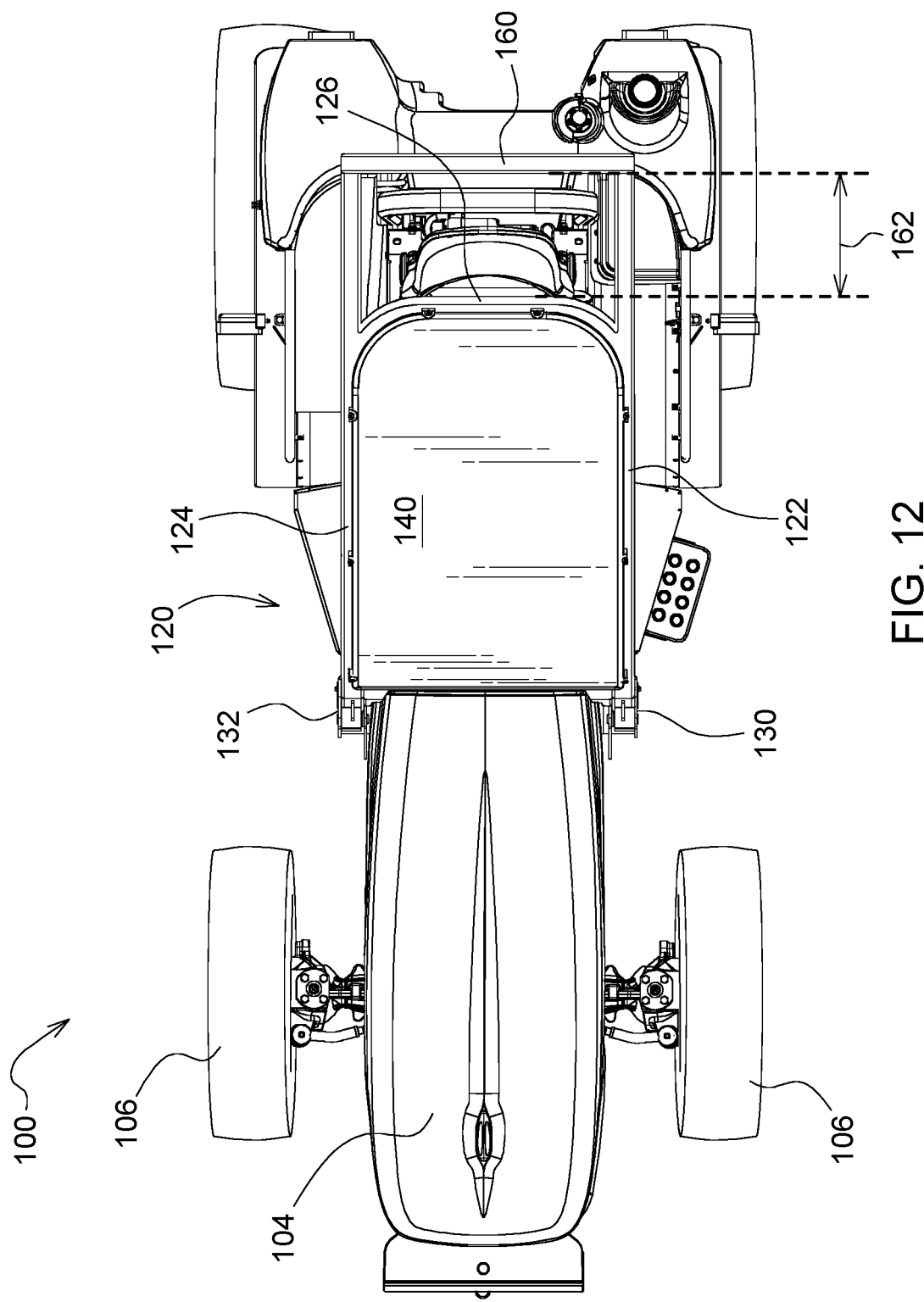
FIG. 12 is a top perspective view of a work vehicle including a curved structure, according to an implementation.

With reference to FIGS. 10-12, a curved support 120 can connect to a rear support 160 attached to the work vehicle 100. The rear support 160 can be substantially vertical. The rear support 160 can be in the form of a roll bar. The rear support 160 can extend above the curved support 120. The first and second supports 122, 124 can extend rearward to the rear support 160. The first and second supports 122, 124 can connect to the rear support 160. The windshield 140 can extend to the rear support 160 or there can be a selected distance 162 between the windshield 140 and the rear support 160 forming an opening between the windshield 140 and the rear support 160. The curved support 120 can include a top support 126. According to some implementations, the top support 126 is an optional support member.

When the curved structure 120 is installed on a work vehicle 100, the curved structure 120 can provide a barrier against vegetation (e.g., limbs, branches, bushes, or shrubs) from contacting an operator of the work vehicle 100. The curved structure 120 can prevent vegetation extending within a boundary of the work vehicle 100 from entering the open operator station 102. The curved structure 120 also allows extensive visibility of the operating area surrounding the work vehicle 100. During forward operation of the work vehicle 100, the curved structure 120 can guide vegetation up and over the open operator station 102 and the operator of the work vehicle 100. The curved structure 120 can also function as a roll over protection system, or roll over protective structure, referred to as ROPS.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A work vehicle including a curved structure, comprising:
    a first curved support extending a length;
    a second curved support extending a length, the second curved support spaced apart a width from the first curved support;
    a curved windshield positioned between and connected to the first and second curved supports, the curved windshield extending upward and rearward beyond at least a front portion of a seat in the work vehicle;
    a first base portion attached to a chassis of the work vehicle, the first base portion positioned near a lower end of the first curved support; and
    a second base portion attached to a chassis of the work vehicle, the second base portion positioned near a lower end of the second curved support, the first and second base portions attached to a chassis of the work vehicle at a position forward of a steering wheel of the work vehicle;
    wherein a lower portion of the curved structure is attached to the chassis of the work vehicle only at the position forward of a steering wheel of the work vehicle, an upper portion of the curved structure is unattached to the work vehicle, and the curved structure functions as a ROPS for the work vehicle.

2. The work vehicle of claim 1, further comprising:
    a top support connected near an end of the first curved support and an end of the second curved support.

3. The work vehicle of claim 2, wherein the first curved support, the second curved support, and the top support are a single piece.

4. The work vehicle of claim 1, wherein an angle of an arc formed by the first curved support is greater than forty-five degrees.

5. The work vehicle of claim 1, wherein an angle of an arc formed by the first curved support is between sixty and one hundred twenty degrees.

6. The work vehicle of claim 1, wherein an angle of an arc formed by the first curved support is between seventy-five and one hundred five degrees.

7. The work vehicle of claim 1, wherein an angle of an arc formed by the first curved support is greater than seventy-five degrees.

8. The work vehicle of claim 1, wherein an angle of an arc formed by the first curved support is less than one hundred thirty-five degrees.

9. The work vehicle of claim 1, wherein an angle of an arc formed by the first curved support is less than one hundred twenty degrees.

* * * * *